US008031628B2

(12) United States Patent  
Gu et al.

(10) Patent No.: US 8,031,628 B2
(45) Date of Patent: Oct. 4, 2011

(54) OPTIMAL PROBING FOR UNICAST NETWORK DELAY TOMOGRAPHY

(75) Inventors: Yu Gu, Plainsboro, NJ (US); Geoff Jiang, Princeton, NJ (US); Vishal Singh, Plainsboro, NJ (US); Yueping Zhang, Somerset, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 224 days.

(21) Appl. No.: 12/478,030

(22) Filed: Jun. 4, 2009

(65) Prior Publication Data

US 2010/0118715 A1 May 13, 2010

Related U.S. Application Data

(60) Provisional application No. 61/113,274, filed on Nov. 11, 2008.

(51) Int. Cl.
*H04L 12/26* (2006.01)
(52) U.S. Cl. ........ 370/252; 370/255; 709/224; 714/47.1
(58) Field of Classification Search .................. 370/252, 370/241, 254, 255; 709/223, 224; 714/47, 714/47.1
See application file for complete search history.

(56) References Cited

U.S. PATENT DOCUMENTS

| 7,293,086 | B1* | 11/2007 | Duffield et al. | 709/224 |
|---|---|---|---|---|
| 2002/0116154 | A1* | 8/2002 | Nowak et al. | 702/186 |
| 2005/0081116 | A1* | 4/2005 | Bejerano et al. | 714/47 |
| 2007/0091937 | A1* | 4/2007 | Bu et al. | 370/519 |
| 2009/0080339 | A1* | 3/2009 | Duffield et al. | 370/252 |
| 2009/0080340 | A1* | 3/2009 | Duffield et al. | 370/252 |

OTHER PUBLICATIONS

E. Lawrence, G. Michailidis, and V. N. Nair. Network delay tomography using flexicast experiments. Journal of the Royal Statistical Society: Series B (Statistical Methodology), 68:785-813(29), Nov. 2006.
B. Xi, G. Michailidis, and V. N. Nair. Estimating network loss rates using active tomography. Journal of the American Statistical Association, 101:1430-1448, Dec. 2006.
M. J. Coates and R. D. Nowak. Network tomography for internal delay estimation. In In Proceedings of the IEEE International Conference on Acoustics, Speech and Signal Processing (ICASSP), pp. 3409-3412, 2001.
N. G. Duffield, J. Horowitz, F. L. Presti, and D. F. Towsley. Network delay tomography from end-to-end unicast measurements. In IWDC'01, pp. 576-595, London, UK, 2001. Springer-Verlag.

* cited by examiner

*Primary Examiner* — Luat Phung
(74) *Attorney, Agent, or Firm* — Bao Tran; Joseph Kolodka

(57) ABSTRACT

Systems and methods are disclosed to probe a network includes generating a set of probing pairs from a network topology for unicast network delay tomography; probing the network using monitoring hosts in the network; and determining network performance from the probing results.

20 Claims, 3 Drawing Sheets

OPTIMAL PROBING FOR UNICAST NETWORK DELAY TOMOGRAPHY

This application claims priority to U.S. Provisional Application Ser. No. 61/113,274 filed Nov. 11, 2008, the content of which is incorporated by reference.

BACKGROUND

Network performance monitoring is an important issue in the networking community. Accurate and efficient estimation of the network performance provides fundamental supports for network management routines like traffic engineering and network anomaly detection.

Along the road of developing accurate and efficient network monitoring approaches, network tomography is noted for its ability to ascertain internal network performances from end-to-end measurements. Given the fast transient nature of Internet traffic dynamics, it is essential for network tomography to ascertain certain accuracy with a constrained time and traffic volume budget. However, when monitoring large scale networks, this is very challenging as on one side, low probing traffic volume is required to minimally affect underlying network performance, and on the other side, enough probing traffic is required to cover the entire network and achieve accurate estimation in a relatively short period.

In network tomography, multiple monitoring hosts are deployed at the edge of the network. These monitoring hosts function as receivers of end-to-end probing packets sent from a common source. By collecting delay and loss information at these monitoring hosts, network tomography develops maximum likelihood estimators (MLE) of delay and loss performances of internal network links on the paths from the source to the monitoring hosts. This ability makes network tomography especially appealing to applications that concern network performances but don't have access to internal network states. In particular, unicast based network delay tomography can be used to estimate network delay characteristics by probing a set of end host pairs in sequence.

SUMMARY

In one aspect, a method to probe a network includes generating a set of probing pairs from a network topology for unicast network delay tomography; probing the network using monitoring hosts in the network; and determining network performance from the probing results.

In another aspect, a system to probe a network includes a sender computer and a plurality of receiver computers; and a probe coupled to the sender and receiver computers, the probe generating a set of probing pairs from a network topology for unicast network delay tomography.

Implementations of the above aspects may include one or more of the following. The system can receive network performance data and applying the network performance data to generate the set of probing host pairs. The system can determine a covariance matrix of a maximum likelihood estimator (MLE) for unicast network delay tomography to determine estimation accuracy. The covariance matrix $I^{-1}$ can be an inverse of $$I = \sum_{(r_1, r_2)} \omega(r_1, r_2) I(r_1, r_2)$$

where $\omega(r_1, r_2)$ is the number of probing pair $(r_1, r_2)$. The covariance matrix $I^{-1}$ corresponds to the most accurate estimation. The system can determine an optimal probing pair as an optimal experimental design problem and in one embodiment can be solved by obtaining an optimal set of probing pairs using semi-definite programming (SDP). The optimal set of probing pairs can be selected with an optimal criteria from: E-Optimality, which minimizes the maximum eigenvalue of $I^{-1}$; A-Optimality, which minimizes the trace of $I^{-1}$; and D-Optimality, which minimizes the determinant of $I^{-1}$. The optimal set of probing pairs can be determined using a greedy process. The system includes designing a maximum likelihood estimator (MLE) with a minimum sum of variances by selecting an optimal set of monitoring probe pairs. A covariance matrix can be derived as the inverse of the Fisher information matrix for an observed information matrix on the network topology. The observed information matrix can be derived using an upward-downward process. The system can probe different pairs of monitoring hosts to improve the estimation accuracy. An observed information matrix (OIM) J can be determined. In one embodiment, the OIM is determined as:

$$J_{l',d',l'',d''}(o_{r_1}, o_{r_2}) = \frac{AL - D_{l',d'} D_{l'',d''}}{L^2}$$

and $$J(o_{r_1}, o_{r_2}) = (J_{l',d',l'',d''}(o_{r_1}, o_{r_2}))$$

as a matrix defining contributions to the OIM made by a pair of observations $(o_{r_1}, o_{r_2})$ where (l', d') is a row index and (l'', d'') is a column index, L is a likelihood function for a single pair of observations $(o_{r_1}, o_{r_2})$. The determination of J is the following two observations:

$$P(D_{l^*} = d^*, o_{r_1}, o_{r_2}) = D_{l^*,d^*} \theta_{l^*,d^*}$$

and $$P(D_{l'} = d', D_{l''} = d'', o_{r_1}, o_{r_2}) = A \theta_{l',d'} \theta_{l'',d''} \text{ for } l' \neq l''.$$

Advantages of the preferred embodiments may include one or more of the following. By better designing the set of probing pairs, the system can either reduce the amount of probing traffic to reach a certain estimation accuracy or improve the accuracy with a given probing volume budget. To handle the fast transient nature of Internet traffic dynamics, the system's network tomography process can obtain accurate performance estimations within a constrained time and traffic volume budget. The system's efficient estimation techniques use lower probing traffic volume, which enables higher performance monitoring resolution and faster responses to network traffic anomalies. The system can be used for monitoring large scale networks where on one side, low probing traffic volume is required as to minimally affect the underlying network performances and on the other side, enough probing traffic is required to cover the entire network and achieve accurate estimation in a relatively short period.

DESCRIPTION

Figure 1:
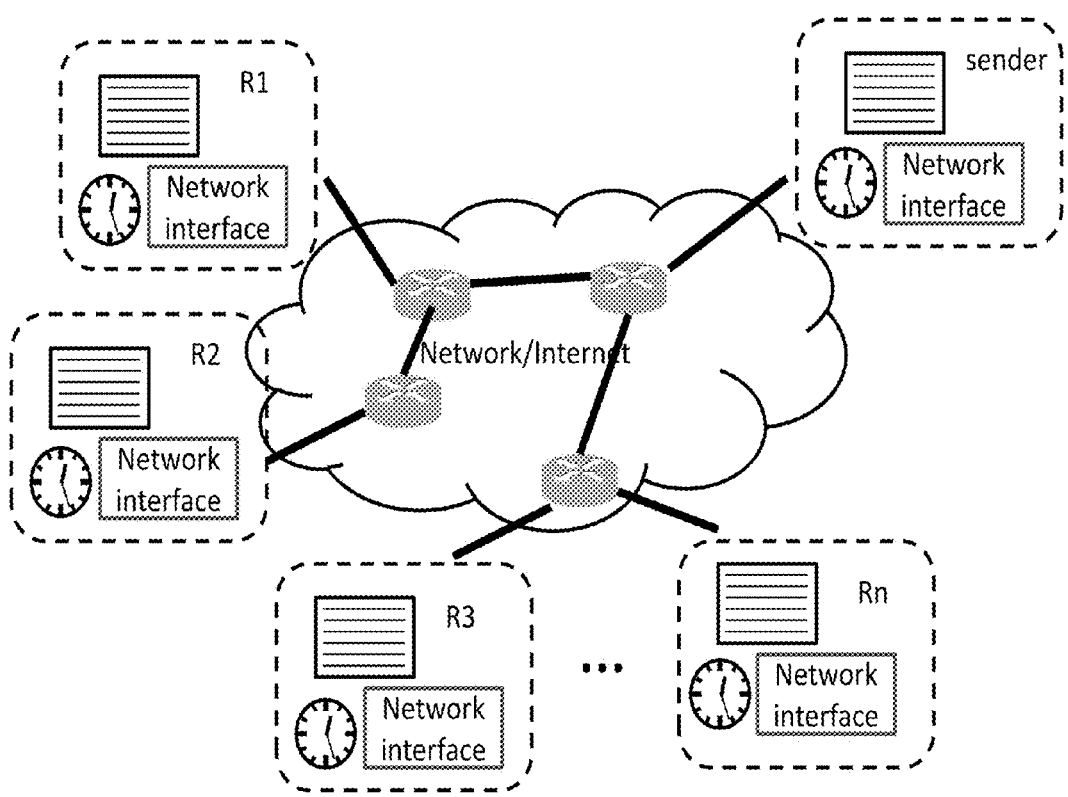
FIG. 1 shows an exemplary network for determining network delay tomography.

FIG. 1 shows an exemplary network to be probed. In the network, sender communicates with a plurality of receivers R1, R2, . . . , Rn. Each of sender and receivers includes a network interface. The sender uses the network interface to send probing packets and receivers use the network interface to receive probing packets. Through a clock, the sender records the time when a probing packet is sent. A receiver clock records the time when a probing packet is received. A recording device is used to track time in the sender and the receivers. The sender records the sending times of the packets and packet index. The receiver records the receiving times of the packets and packet index. Both roles can be handled by suitable personal computers. The topology, which is the paths from the sender to the receivers, is known in advance. The system determines the best way for s to distribute probing packets among the monitoring devices so that the most accurate estimation can be made. This can be done by determining how s sends the probing traffic.

Figure 2:
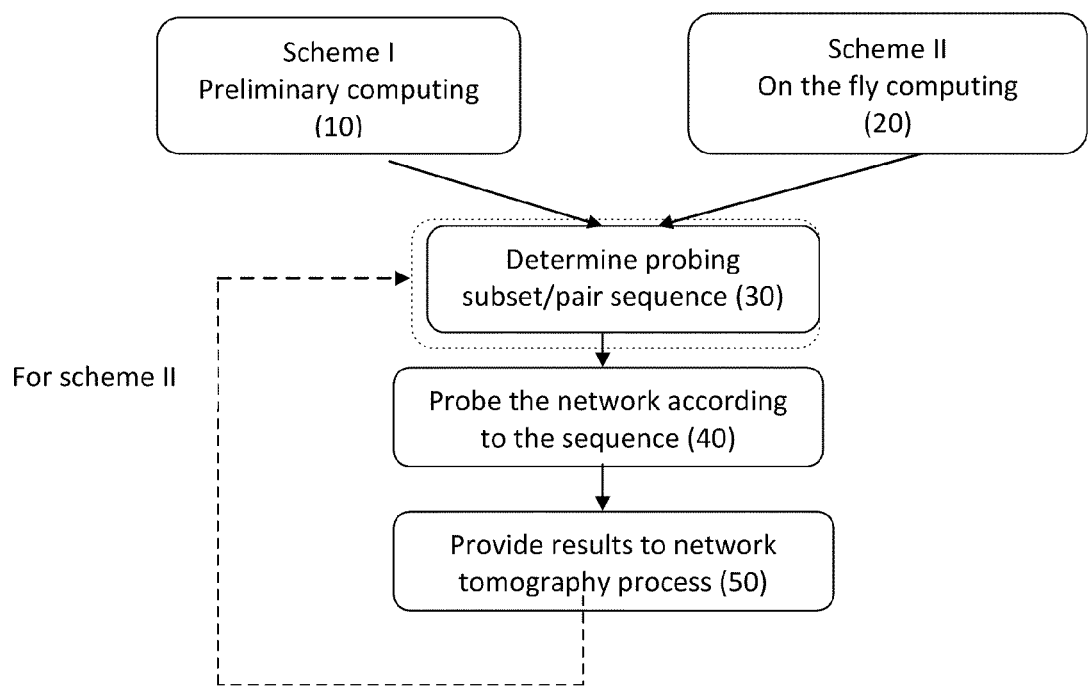
FIG. 2 shows an exemplary process to estimate network performance using network tomography analysis.

FIG. 2 shows an exemplary process to estimate network performance using network tomography analysis. Two schemes are provided in FIG. 2. Network tomography works by probing subsets (usually pairs) of monitoring hosts in the network and inferring network performance from the probing results. The two schemes use a more efficient set of probing subsets/pairs so that the measurement results from these probing enable network tomography process to generate more accurate results; or fewer number of probing are required for network tomography process to reach certain level of accuracy.

In one embodiment known as Scheme I, the process performs preliminary processing on previously captured network data (10). Next, the process determines the probing sequence (30) before the actual probings are performed. The probing operation (40) probes the network according to the probing sequence determined in (30). The probing results obtained from (40) are then fed to the network tomography process in (50) to obtain an estimation of network performance.

In Scheme II, the probing sequence is calculated 'on the fly'. Before actual probes are performed, the process only calculates a predefined number of probing rounds (30). Then in (40) the system probes the network accordingly and feeds the result to the network tomography process (50). After initial estimations of the network performance are obtained, the information is provided to the probing subset/pair sequence determining operation (30) for another iteration until an error threshold is reached and then the system can stop iterating.

The optimal probing sequence is determined by both the network topology information and the network delay distribution. The system utilizes only the topology information and assume no prior knowledge about network delay distribution when there is no delay performance available. This can provide the system with a set of probing pairs before any measurements are performed. After this set of probing is performed, rough estimations of the network performances can be obtained. These estimations can then be used as input to the priority probing process and generate the next probing set. And the process continues in an iterative way. The interleaving scheme will generate probing sequences that lead to more accurate and efficient estimations.

Figure 3:
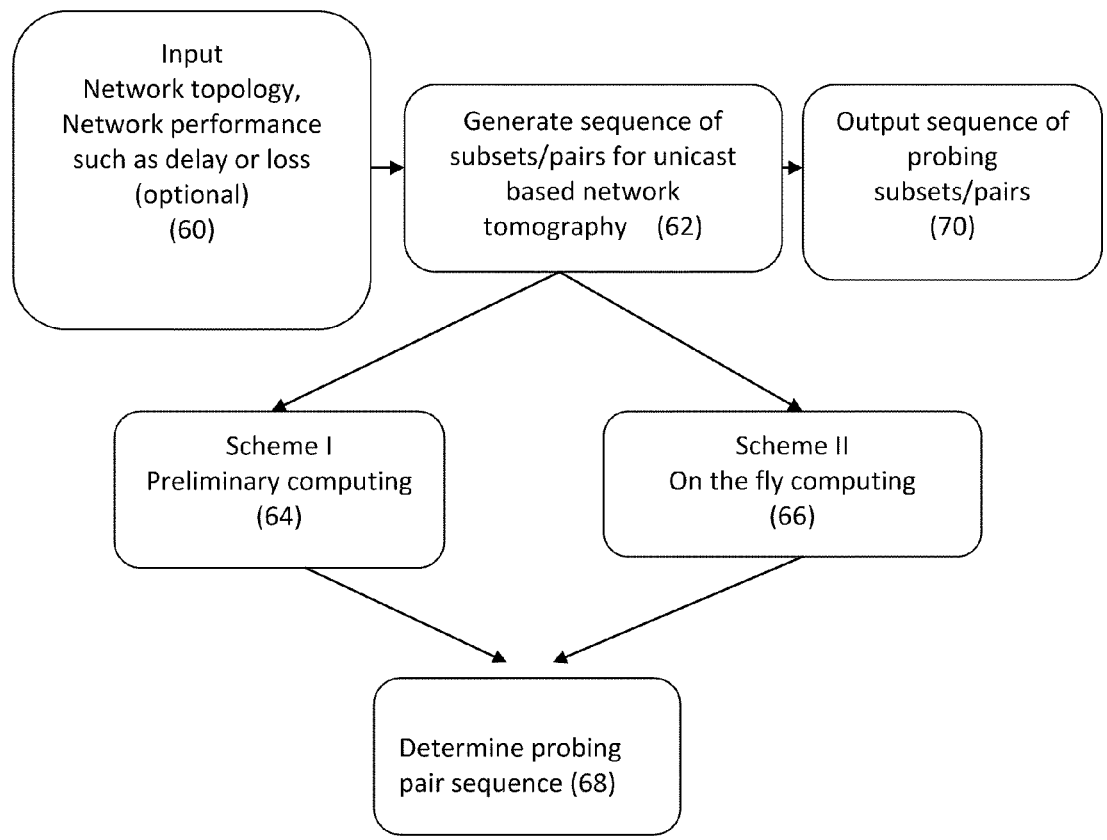
FIG. 3 shows another exemplary process to estimate network performance using network tomography analysis.

The process of FIG. 3 takes as input the network topology and also optionally available network performance data such as delay and loss (60). The process then generates an efficient probing subset/pair sequence (62) and outputs a sequence of probing subsets/pairs (70). Two alternatives can be used to determine the subset/pair sequence: a preliminary processing operation (64) or an on-the-fly processing option (66), and the result from either (64) or (66) can be used to determine the probing pair sequence (68) which is outputted in (70). Probings performed according to this sequence enable network tomography to generate more accurate results compared with the same number of probing using uniform probing scheme.

The above priority probing process is an optimal probing scheme that probes the network in a most efficient manner for unicast delay tomography. The unicast delay tomography problem can be formulated as an optimal experimental design problem, and for a fixed number of pairs, a maximum likelihood estimator (MLE) with minimum sum of variances can be designed by selecting an optimal set of monitoring host pairs. The optimal probing set can be located using semi-definite programming (SDP). A greedy process can be used in lieu of SDP that approximates the optimal solution.

In one implementation, the paths from s to R are stationary and form a logical tree topology T=(V, E). V is the set of vertices including the source s, the receivers R and the set of branch points. A branch point is a point where two paths split. E is the set of links in T. A link l∈E is a path segment between two vertices in V without passing any other vertex. In network tomography, a link in the logical tree can potentially correspond to a number of physical links in the underlying network. Let $D_l$ be the queuing delay on link l. $D_l$ is a random variable and the goal of network delay tomography is to estimate the distribution of $D_l$ for all l in E. $L_i$ is the set of links on the path from s to receiver i and $L_{i,j}=L_i \cup L_j$.

The measurements are performed by sending probes to a set of T monitoring host pairs $S=\{(r_1^t, r_2^t)\}$, $r_1^t \neq r_2^t \in R$, t=1 . . . T, pair by pair. In round t, a pair of receivers $(r_1^t, r_2^t)$ is selected and two probing packets are sent back to back from s, one to $r_1^t$ and the other to $r_2^t$. The assumption is that the two probing packets experience the same or similar delays when they pass through the shared links on the two paths, which brings in correlations in their delay observations. For easy discussion, the probing packets are assumed to not be lost and the delays of these two packets are represented as a pair of observations $(O_{r_1^t,t}, O_{r_2^t,t})$. Pairs of probes are sent in multiple rounds and a set of observation pairs $\{(O_{r_1^t,t}, O_{r_2^t,t})\}$ are obtained.

All delay observations are then adjusted by deducting from them the smallest delay seen on the corresponding path. It is assumed that the smallest delay represents transmission delay and propagation delay along the path and the rest of the delay represents the dynamic part, i.e. queuing delay. As a consequence, delay tomography estimates only the dynamic delay distribution and is not affected by time differences among the source and the receivers. Clock drifting will affect the estimation accuracy, but it is usually small enough to be ignored.

Delays are discretized into k bins $B_0=[0,\tau)$, $B_1=[\tau,2\tau)$, . . . , $B_{k-1}=[(k-1)\tau,\infty)$ where τ is a predefined constant bin size. For a link l∈E, its delay $D_l$ is then discretized into a multinomial distribution random variable with parameters $\{\theta_{l,d}\}$, $0 \leq d \leq k-1$ and $\Sigma_d \theta_{l,d}=1$. Link delays are assumed to be independent across links and estimating link delay distribution then turns into estimating $\bar{\theta}$, the parameters of the independent multinomial delay distributions.

With $\{(O_{r_1,t}, O_{r_2,t})\}$, the set of observations collected from multiple rounds, the likelihood function is $$L(\vec{\theta}) = \prod_t \left( \sum_{\{(l,d)\} \in \Omega(o_{r_1,t}, o_{r_2,t})} \prod_{l \in L_{r_1,r_2}} \theta_{l,d} \right) \quad (1)$$

where $\Omega(O_{r_1,t}, O_{r_2,t})$ is all the possible combinations of link delays that satisfy the observation $(O_{r_1,t}, O_{r_2,t})$. For clear presentation, $\Omega$ is used instead of $\Omega(O_{r_1,t}, O_{r_2,t})$.

A direct expression for $\{\theta_{l,d}\}$ that maximizes (1) is difficult to obtain. As an alternative, an Expectation Maximization (EM) algorithm can be used. The EM algorithm is an iterative process that converges to the MLE of the distribution of network internal link delays.

One step in the EM algorithm developed in network delay tomography computes $P(D_l=d|O_{r_1}=o_{r_1}, O_{r_2}=o_{r_2})$, the conditional probability of a link l having delay d given a pair of observations. This is achieved by using the upward-downward process.

The upward-downward process is similar to the forward-backward process developed for estimating parameters in a Hidden Markov Model. It is developed to calculate belief propagation in causal trees, a special case of Bayesian networks. A causal tree is a tree structure where each vertex v in the tree has a state $O_v$. The state of a vertex is only dependent on its parent's state except for the top vertex, whose state is independently distributed. In other words, the child's state $O_v$ is a random variable following a predefined conditional probability $P(O_v|O_{v'})$, where v' is the parent of v. Once the top vertex state distribution and the conditional probabilities among the vertices are fixed, the upward-downward process efficiently calculates, among other properties, $P(\{O_v=o_v\}, v \in V)$, the probability that a subset of vertices V takes certain states $\{O_v=o_v\}$, $v \in V$.

In unicast based network delay tomography, the upward-downward process is applied in the following way to obtain $P(D_l=d|O_{r_1}=o_{r_1}, O_{r_2}=o_{r_2})$, the conditional probability of a link l having delay d given a pair of observations.

First, since at each round only a pair of receivers is selected, the causal tree is constructed and has the same topology as the subtree of T corresponding to the paths leading to the two receivers. The state of each vertex is a random variable taking value from $B_0$ to $B_{k-1}$. It represents the delay that a packet has experienced from the source to the vertex. For the source s, its state $O_s$ is always set to $B_0$, indicating the packet has experienced zero delay at the source. The conditional probabilities between two vertices are determined as follows. Let $O_c$ be the child node's state and $O_p$ be the state of its parent. If $O_p=B_0$, the conditional probability $P(O_c=B_i|O_p=B_0)=\theta_{l,i}$, where l is the link from the parent vertex to the child vertex. If $O_p=B_1$, the conditional probability $P(O_c=B_0|O_p=B_1)=0$ indicating the delay cannot be decreased, $P(O_c=B_i|O_p=B_1)=\theta_{l,i-1}$ for $1 \leq i < k-1$, and $P(O_c=B_{k-1}|O_p=B_1)=\theta_{l,k-2}+\theta_{l,k-1}$. The rest of the conditional probabilities can be determined similarly.

With the causal tree set up, many important properties in the network delay tomography problem can be evaluated using the upward-downward process. For example, $P(O_{r_1}=o_{r_1}, O_{r_2}=o_{r_2})$ the likelihood of observing a pair of observations $(O_{r_1}, O_{r_2})$ is just the probability of vertices $\{r_1, r_2\}$ taking states $\{O_{r_1}=o_{r_1}, O_{r_2}=o_{r_2}\}$. Also, $P(D_l=d, O_{r_1}=o_{r_1}, O_{r_2}=o_{r_2})$, the likelihood of observing a pair of observations $(o_{r_1}, o_{r_2})$ and a link l from $v_1$ to $v_2$ having delay d can be obtained by calculating the probabilities $P(O_{v_1}=o_{v_1}, O_{v_2}=o_{v_1}, O_{r_1}=o_{r_1}, O_{r_2}=o_{r_2})$ considering all the cases where states $O_{v_1}$ and $O_{v_2}$ satisfy the constraint that the corresponding link delay from $v_1$ to $v_2$ is d. And $P(D_l=d|O_{r_1}=o_{r_1}, O_{r_2}=O_{r_2})$ can be thus obtained. In this work, we will use these results in our later development, in particular, to calculate $P(O_{r_1}=o_{r_1}, O_{r_2}=o_{r_2})$ and $P(D_l=d, O_{r_1}=o_{r_1}, O_{r_2}=o_{r_2})$.

The upward-downward process is a polynomial time algorithm. The covariance matrix of the MLE, whose inverse is the Fisher information matrix, determines the accuracy of the estimation. The diagonal elements in the covariance matrix determine the variances of the estimators and the off-diagonal elements determine the correlations among the estimators. The ability to calculate the covariance matrix enables us to evaluate the estimation accuracy by probing a set of probing pairs.

The covariance matrix of the MLE in unicast network delay tomography can be determined by the set of probing host pairs S. The system can numerically determine the covariance matrix with a given S. As there is no closed form for the gradient vectors of the log of the likelihood function, the upward-downward process is used to obtain a numerical solution. The system determines an observed information matrix (OIM) J, as the Fisher information matrix I is the expectation of J. Then the system determines $I(r_1, r_2)$, the expected contribution to the OIM from a pair of receivers $(r_1, r_2)$. The Fisher information matrix I is obtained as a linear combination of $I(r_1, r_2)$, whose coefficients are determined by S. The covariance matrix is then the inverse of the Fisher information matrix. The speed of achieving accurate estimation can be enhanced by designing/picking/selecting the best covariance matrix. This is achieved by 1) discovering the structure of the covariance matrix, which is determined by the set of probing host pairs, and developing a numerical technique to calculate it; and 2) designing/picking/selecting the best set of probing host pairs.

The OIM of an MLE, J, quantifies the covariance matrix of the estimator after a set of observations is obtained. It is defined as $$J = -\nabla \nabla^T l(\vec{\theta}) \quad (2)$$

where $$l(\vec{\theta}) = \sum_t \log \left( \sum_{\{(l,d)\} \in \Omega} \prod_{l \in L_{r_1,r_2}} \theta_{l,d} \right) \quad (3)$$

is the log likelihood function of (1).

Let $$L_t = \sum_{\{(l,d)\} \in \Omega} \prod_{l \in L_{r_1,r_2}} \theta_{l,d} \quad (4)$$

be the term inside the log in (3). $L_t$ is the likelihood for a single pair of observations $(O_{r_1,t}, O_{r_2,t})$. Its derivative with regard to parameter $\theta_{l',d'}$ is then $$D_{t,l',d'} = \sum_{\{(l,d)\} \in \Omega, D_{l'}=d'} \prod_{l \in L_{r_1,r_2}, l \neq l'} \theta_{l,d}, \quad (5)$$

and its second order derivative with regard to parameters $\theta_{l',d'}$, $\theta_{l'',d''}$ is $$A = \begin{cases} 0, & l' = l''; \\ \sum_{\substack{\{(l,d)\} \in \Omega, \\ D_{l'}=d', D_{l''}=d''}} \prod_{\substack{l \in L_{r_1,r_2}, \\ l \neq l', l \neq l''}} \theta_{l,d}, & \text{otherwise} \end{cases} \quad (6)$$

Then for each of the matrix element in (2)

$$\frac{\partial^2 l(\bar{\theta})}{\partial \theta_{l',d'} \partial \theta_{l'',d''}} = \sum_t \frac{AL_t - D_{t,l',d'} D_{t,l'',d''}}{L_t^2}, \quad (7)$$

In particular, we have the diagonal element for a particular parameter $\theta_{l^*,d^*}$ $$\frac{\partial^2 l(\bar{\theta})}{\partial \theta_{l^*,d^*}^2} = -\sum_t \left(\frac{D_{t,l^*,d^*}}{L_t}\right)^2. \quad (8)$$

Equation (7) indicates that in unicast based network delay tomography, each pair of observations contributes additively to the OIM. In the following, the system can calculate quantitatively this additive contribution from each pair of observations, and therefore, the whole OIM after a set of probing pairs.

$$J_{l',d',l'',d''}(o_{r_1}, o_{r_2}) = \frac{AL - D_{l',d'} D_{l'',d''}}{L^2} \quad (9)$$

as the term in the summation in (7) and $$J(o_{r_1}, o_{r_2}) = (J_{l',d',l'',d''}(o_{r_1}, o_{r_2})) \quad (10)$$

as the corresponding matrix defining the contribution to the OIM made by a pair of observations $(o_{r_1}, o_{r_2})$, where $(l',d')$ defines the row index and $(l'',d'')$ defines the column index. Note that from now on, we also omit the round index t whenever there is no ambiguity.

Next, L, A and $D_{l^*,d^*}$ is determined numerically as part of th evaluation of (9). L is the likelihood function for a single pair of observations $(o_{r_1}, o_{r_2})$. L can be determined directly using the upward-downward process by assigning the two leave vertices their observed delay bins. The determination of $D_{l^*,d^*}$ and A comes from the following two observations:

$$P(D_{l^*}=d^*, o_{r_1}, o_{r_2}) = D_{l^*,d^*} \theta_{l^*,d^*} \quad (11)$$

and $$P(D_{l'}=d', D_{l''}=d'', o_{r_1}, o_{r_2}) = A \theta_{l',d'} \theta_{l'',d''} \quad (12)$$

for $l' \neq l''$.

With these observations and the upward-downward process as discussed above, $D_{l^*,d^*}$ and A can be readily obtained. $D_{l^*,d^*}$ is obtained by evaluating the probabilities $P(O_{v_1}, O_{v_2}, O_{r_1}=o_{r_1}, O_{r_2}=o_{r_2})$ where $v_1$ and $v_2$ are determined by $l^*$ and their states determined by $d^*$. The determination of A requires evaluating the probabilities $P(O_{v'_1}, O_{v'_2}, O_{v''_1}, O_{v''_2}, O_{r_1}=o_{r_1}, O_{r_2}=o_{r_2})$ in the causal tree, where $v'_1$ and $v'_2$ are determined by $l'$, $v''_1$ and $v''_2$ are determined by $l''$ and their states determined by $d'$ and $d''$ respectively. J can be expressed as:

$$J = \sum_{(r'_1, r'_2) \in} J(o_{r'_1}, o_{r'_2}).$$

Next, the expected impact from a pair of receivers is discussed. The system can evaluate $I(r_1, r_2)$, the expected contributions to the OIM from probing the pair $(r_1, r_2)$. This quantifies the average impact on estimation accuracy by probing a pair of receivers and this is actually the building piece of the Fisher information matrix.

$$I(r_1, r_2) = EJ(o_{r_1}, o_{r_2}).$$

Let $(I_{l',d'_l,l'',d''_l}(r_1, r_2))$ be the elements in $I(r_1, r_2)$. Ast $L=P(o_{r_1}, o_{r_2})$, the likelihood function for a single observation $(o_{r_1}, o_{r_2})$, the above becomes $$I_{l',d'_l,l'',d''_l}(r_1, r_2) = EJ_{l',d'_l,l'',d''_l}(o_{r_1}, o_{r_2}) \quad (13)$$

$$= \sum_{o_{r_1}, o_{r_2}} P(o_{r_1}, o_{r_2}) J_{l',d'_l,l'',d''_l}(o_{r_1}, o_{r_2})$$

$$= \sum_{o_{r_1}, o_{r_2}} A - \frac{D_{l',d'_l} D_{l'',d''_l}}{L}$$

$I(r_1, r_2)$ is determined by both the subtree topology and the delay characteristics of the links in the subtree. This implies that in later stage of this work, when we design the optimal probing set, one needs to consider both the topology structure and the delay distributions.

Next, the Fisher information matrix is discussed. Since the Fisher information matrix $$I = EJ,$$

$$J = \sum_{(r'_1, r'_2) \in S} J(o_{r'_1}, o_{r'_2}), \text{ and}$$

$$I(r'_1, r'_2) = EJ(o_{r'_1}, o_{r'_2}),$$

we have, given S, the Fisher information matrix $$I = \sum_{(r'_1, r'_2) \in S} I(r'_1, r'_2). \quad (14)$$

Let $\omega(r_1, r_2)$ be the number of probing pair $(r_1, r_2)$ in S, the above can also be written as $$I = \sum_{(r_1, r_2)} \omega(r_1, r_2) I(r_1, r_2). \quad (15)$$

The covariance matrix is then $I^{-1}$. And this is how the set of probing pairs S determines the covariance matrix.

In one embodiment, priority probing can be done. Equation (15) demonstrates how the probing set S determines the covariance matrix $I^{-1}$ of unicast delay tomography MLE. As a consequence, by properly design S, the process can obtain an covariance matrix $I^{-1}$ that corresponds to the most accurate estimations. This is a typical optimal experimental design problem ahd the resulting probing scheme is called priority probing.

Optimal experimental design problems usually target at one of the three commonly desired optimal criteria: E-Optimality, which minimizes the maximum eigenvalue of $I^{-1}$; A-Optimality, which minimizes the trace of $I^{-1}$; and D-Optimality, which minimizes the determinant of $I^{-1}$. All of them can be properly formulated into semi-definite programming (SDP) problem.

One embodiment uses the A-Optimality criteria because the trace of $I^{-1}$ has a direct explanation as the sum of estimation variances on all links and A-Optimality then implies globally minimizing the estimation variances. The A-Optimality problem can then be formalized as a convex optimization form $$\min_{s.t.\ t_i \geq e'_i I^{-1} e_i, i=1,\ldots,k|E|} \sum t_i \quad (16)$$

$$I = \sum_{(r_1,r_2)} \omega(r_1, r_2) I(r_1, r_2)$$

$$\sum_{(r_1,r_2)} \omega(r_1, r_2) = T$$

$$\omega(r_1, r_2) \geq 0$$

where $e_i$ is the ith unit-vector of $R^{k|E|}$, $\omega(r_1, r_2)$ is the number of probing pair $(r_1, r_2)$ in S, and T is the predefined size of S. Using Schur complement, the first set of inequality constraints in a semi-definite form becomes:

$$\begin{pmatrix} I & e_i \\ e'_i & t_i \end{pmatrix} \geq 0.$$

The optimization problem (16) can then be solved using SDP and the number of probing pair $(r_1, r_2)$ in the optimal probing set S is $\omega(r_1, r_2)$.

While SDP provides the optimal probing set for unicast delay tomography, it can be computationally intensive. In one embodiment, a greedy approach is used that requires much less computation cost and whose performances are demonstrated to be close to the optimal in simulation results.

In the greedy approach, the diagonal of the covariance matrix can be approximated by considering only the diagonal elements in I and assuming all other elements are 0. This is the best estimate without calculating the off-diagonal elements, which is computationally expensive.

In this approach, I(t) is the Fisher information matrix of the MLE after t rounds of measurements and $\Lambda(t)$ is the set of diagonal elements of I(t) and $\lambda_{l,d}(t) \in \Lambda(t)$ is the diagonal elements. For only the diagonal elements of I(t), the sum of estimation variances is then $$S(t) = \sum_{l,d} |\lambda_{l,d}^{-1}(t)|. \quad (17)$$

The greedy process works as follows. For each pair of receivers $(r_1, r_2)$ $\{I_{l,d,l,d}(r_1, r_2)\}$, the process obtains a set of expected contributions to the diagonal elements $\{\lambda_{l,d}(t)\}$ of the Fisher information matrix.

The process maintains the state $\Lambda(t)$. Initially, all elements of $\Lambda(0)$ are set to 0. At round t, the process evaluates for each pair $(r_1, r_2)$ the expected value of $\Lambda(t)$ after round t $$\lambda_{l,d}(r_1,r_2) = \lambda_{l,d}(t-1) + I_{l,d,l,d}(r_1,r_2) \quad (18)$$

and obtain the following metric $$S(r_1, r_2) = \sum_{l,d} |(\lambda_{l,d}(r_1, r_2))^{-1}|. \quad (19)$$

After the evaluation is performed over all pairs, the pair $(r_1^*, r_2^*)$ that leads to the minimum $S(r_1, r_2)$ is selected for round t. Then $\Lambda(t)$ is updated as $$\lambda_{l,d}(t) = \lambda_{l,d}(t-1) + I_{l,d,l,d}(r_1^*, r_2^*), \quad (20)$$

And the pair for round t+1 is selected similarly.

Also in the first few rounds, since there are 0's in $\Lambda(t)$, $S(r_1, r_2)$ cannot be evaluated and those pairs that remove the most number of 0's are selected. When all 0's in $\Lambda(t)$ are eliminated, the above procedure is repeated until t=T. Pseudo-code for the greedy process is as follows:

```
Require: {I_{l,d,l,d}(r_1,r_2)} for all pairs (r_1,r_2)
Λ(t) = 0
t = 1
while t ≤ T do
    if there is 0 in Λ(t) then
        Pairs(t) = (r_1,r_2) that removes maximum
            number of 0 in Λ(t)
    else
        MinimumS = A_LARGE_NUMBER
        for all (r_1,r_2) do
            for all l,l_d do
                λ_{l,d}(r_1,r_2) = λ_{l,d}(t - 1) + I_{l,d,l,d}(r_1,r_2)
            end for
            S(r_1,r_2) = Σ_{l,l_d} |(λ_{l,d}(r_1,r_2))^{-1}|
            if S(r_1,r_2) < MinimumS then
                MinimumS = S(r_1,r_2)
                Pairs(t) = (r_1,r_2)
            end if
        end for
    end if
    for all l,l_d do
        λ_{l,d}(t) = λ_{l,d}(t - 1) + I_{l,d,l,d}(Pairs(t))
    end for
    t = t + 1
end while
return Pairs
```

Interleaving probing pair design and performance inference issues are discussed next. The optimal probing sequence is determined by both the network topology information and the network delay distribution. Existing approaches, i.e. the uniform probing schemes, utilize neither whereas priority probing utilizes both information. One of the common practices in this situation is to utilize only the topology information and assume no prior knowledge about network delay distribution when there is no delay performance available. As the topology information is utilized, this in general still generates better probing schemes than the uniform scheme and can provide a set of probing pairs before any measurements are performed. After this set of probing is performed, rough estimations of the network performances can be obtained. These estimations can then be used as input to the priority probing process and iteratively generate the next probing set. The interleaving scheme generates probing sequences that lead to more accurate and efficient estimations. The system can also perform a sensitivity analysis of the resulting probing set regarding the delay distributions.

The above discussion on priority probing discusses an optimal probing scheme that probes the network in a most efficient manner for unicast delay tomography. Since the network structure can be highly complex, the system properly distributes probing traffic to different parts of the network. The unicast delay tomography problem can be formulated as an optimal design problem, and for a fixed number of pairs, an MLE with minimum sum of variances can be designed by selecting an optimal set of monitoring host pairs. The optimal probing set can be located using SDP. To support large scale scenarios, a greedy process approximates the optimal solution in one embodiment.

The system provides a number of advantages. First, the ability to calculate the covariance matrix of the MLE for unicast network delay tomography enables the system to evaluate the estimation accuracy by probing a set of probing pairs. This can both help network management to determine the required probing traffic before measurement and verify the effectiveness of the estimations. Second, the solution of the optimal experimental design problem provides the most efficient approach to probe the network so that the most accurate estimation can be obtained with a fixed budget of probing traffic volume or measurement time.

As detailed in the incorporated Provisional Patent Application Ser. No. 61/113,274, evaluations through simulation demonstrate that priority probing is very efficient. Evaluations through simulation present that priority probing is very efficient in reducing the probing traffic and increasing the estimation accuracy and the greedy process or greedy algorithm provides a close approximation of the optimal solution. In a network consisting of 100 end hosts, priority probing uses only about 1000 probing pairs to achieve the same accuracy as existing approach using 7000 pairs. With a moderate probing rate of around 20 kbps, this is equivalent to, without compromising accuracy, increasing the monitoring resolution from one measurement result every 6 minutes to one measurement result every 50 seconds. And this advantage of priority probing is expected to become more significant as the network size increases.

Although network delay tomography is mentioned as an application of the above analysis and priority probing technique, unicast based network loss tomography can be treated a special case where there are two bins in the system: $B_0$ indicating that a packet has arrived at the vertex, $B_1$ indicating the packet has been lost. For each link l, there are two parameters: $\theta_{l,1}$ is the packet loss probability at l, and $\theta_{l,0}=1-\theta_{l,1}$. The above system can also be applied to determine the loss tomography where the computation complexity can be reduced and higher accuracy can be achieved.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A computer implemented method to probe a network, comprising:
   a. generating a set of probing pairs from a network topology for unicast network delay tomography;
   b. probing the network using monitoring hosts in the network;
   c. determining network performance from the probing results; and
   d. determining an observed information matrix (OIM) J, wherein the OIM comprises determining $$J_{l',d',l'',d''}(o_{r_1}, o_{r_2}) = \frac{AL - D_{l',d'}D_{l'',d''}}{L^2}$$

and $$J(o_{r_1}, o_{r_2}) = (J_{l',d',l'',d''}(o_{r_1}, o_{r_2}))$$

as a matrix defining contributions to the OIM made by a pair of observations $(o_{r_1}, o_{r_2})$, where (l', d') comprises a row index and (l'', d'') comprises a column index,
L is a likelihood function for a single pair of observations $(o_{r_1}, o_{r_2})$
where the determination of $D_{l^*,d^*}$, A comes from:

$$P(D_{l^*}=d^*, o_{r_1}, o_{r_2}) = D_{l^*,d^*}\theta_{l^*,d^*}$$

and $$P(D_{l'}=d', D_{l''}=d'', o_{r_1}, o_{r_2}) = A\theta_{l',d'}\theta_{l'',d''} \text{ for } l' \neq l''.$$

2. The method of claim 1, comprising receiving network performance data and applying the network performance data to generate the set of probing host pairs.

3. The method of claim 1, comprising determining a covariance matrix of a maximum likelihood estimator (MLE) for unicast network delay tomography to determine estimation accuracy.

4. The method of claim 1, comprising determining a covariance matrix $I^{-1}$ as an inverse of $$I = \sum_{(r_1,r_2)} \omega(r_1, r_2) I(r_1, r_2)$$

where $\omega(r_1, r_2)$ is the number of probing pair $(r_1, r_2)$.

5. The method of claim 1, comprising determining an optimal probing pair as an optimal experimental design problem.

6. The method of claim 5, comprising determining the covariance matrix $I^{-1}$ that corresponds to the most accurate estimation.

7. The method of claim 6, comprising obtaining an optimal set of probing pairs using semi-definite programming (SDP).

8. The method of claim 7, comprising obtaining an optimal set of probing pairs by selecting an optimal criteria from one of: E-Optimality to minimize the maximum eigenvalue of $I^{-1}$; A-Optimality to minimize the trace of $I^{-1}$; and D-Optimality to minimize the determinant of $I^{-1}$.

9. The method of claim 6, comprising obtaining an optimal set of probing pairs using a greedy process.

10. The method of claim 1, comprising designing a maximum likelihood estimator (MLE) with a minimum sum of variances by selecting an optimal set of monitoring probe pairs.

11. The method of claim 1, comprising deriving a covariance matrix as the inverse of the Fisher information matrix for an observed information matrix on the network topology.

12. The method of claim 11, comprising determining the observed information matrix using an upward-downward process.

13. The method of claim 1, comprising probing different pairs of monitoring hosts to improve the estimation accuracy.

14. A system to probe a network, comprising
 a. a sender computer and a plurality of receiver computers; and
 b. a probe coupled to the sender and receiver computers, the probe generating a set of probing pairs from a topology a network for unicast network delay tomography and probing the network using monitoring hosts in the network;

with network performance from the probing results and an observed information matrix (OIM) J being determined, said OIM comprises determining $$J_{l',d',l'',d''}(o_{r_1}, o_{r_2}) = \frac{AL - D_{l',d'} D_{l'',d''}}{L^2}$$

and $$J(o_{r_1}, o_{r_2}) = (J_{l',d',l'',d''}(o_{r_1}, o_{r_2}))$$

as a matrix defining contributions to the OIM made by a pair of observations $(o_{r_1}, o_{r_2})$ where (l', d') comprises a row index and (l'', d'') comprises a column index,
L is a likelihood function for a single pair of observations $(o_{r_1}, o_{r_2})$
where the determination of $D_{l^*,d^*}$, A comes from:

$$P(D_{l^*}=d^*, o_{r_1}, o_{r_2}) = D_{l^*,d^*} \theta_{l^*,d^*}$$

and $$P(D_{l'}=d', D_{l''}=d'', o_{r_1}, o_{r_2}) = A\theta_{l',d'}\theta_{l'',d''} \text{ for } l' \neq l''.$$

15. The system of claim 14, wherein the sender computer determines a covariance matrix of a maximum likelihood estimator (MLE) for unicast network delay tomography to determine estimation accuracy.

16. The system of claim 14, wherein the sender computer determines a covariance matrix $I^{-1}$ as an inverse of $$I = \sum_{(r_1,r_2)} \omega(r_1, r_2) I(r_1, r_2)$$

where $\omega(r_1, r_2)$ is the number of probing pair $(r_1, r_2)$.

17. The system of claim 16, wherein the sender computer determines the covariance matrix $I^{-1}$ that corresponds to the most accurate estimation.

18. The system of claim 17, wherein the sender computer determines an optimal probing pair as an optimal experimental design problem.

19. The system of claim 14, wherein the sender computer determines an optimal set of probing pairs using semi-definite programming (SDP).

20. The system of claim 19, wherein the sender computer determines an optimal set of probing pairs by selecting an optimal criteria from one of: E-Optimality to minimize the maximum eigenvalue of covariance matrix $I^{-1}$; A-Optimality to minimize the trace of covariance matrix $I^{-1}$; and D-Optimality to minimize the determinant of covariance matrix $I^{-1}$.

* * * * *